United States Patent [19]
Jones

[11] 3,958,584
[45] May 25, 1976

[54] SYSTEM FOR FLUSHING OF A MILKING MACHINE

[76] Inventor: Leon Jones, 11332 Pemberton Road, Los Alamitos, Calif. 90720

[22] Filed: Apr. 10, 1975

[21] Appl. No.: 566,701

[52] U.S. Cl. .......................... 134/56 R; 134/166 C; 119/14.18; 137/627.5; 251/33
[51] Int. Cl.² .................... B08B 9/06; F16K 31/143
[58] Field of Search .............. 134/56 R, 57 R, 58 R, 134/116 R, 166 C, 169 R, 169 C; 119/14.18; 137/627.5; 251/33

[56] References Cited
UNITED STATES PATENTS

| | | | |
|---|---|---|---|
| 1,393,387 | 10/1921 | McCornack | 119/14.18 |
| 2,035,533 | 3/1936 | Campbell | 251/33 X |
| 2,685,884 | 8/1954 | Heckendorf | 134/56 R |
| 2,713,344 | 7/1955 | Gallistel | 134/56 R |
| 2,786,445 | 3/1957 | Golay | 119/14.18 UX |
| 2,829,857 | 4/1958 | Williams | 251/33 X |
| 3,006,368 | 10/1961 | George | 137/627.5 X |
| 3,101,742 | 8/1963 | Kellogg | 137/627.5 X |
| 3,417,763 | 12/1968 | Fjermestad et al. | 134/169 C X |
| 3,461,845 | 8/1969 | Peterson | 119/14.18 |
| 3,506,034 | 4/1970 | Branton | 119/14.18 X |

FOREIGN PATENTS OR APPLICATIONS

| | | | |
|---|---|---|---|
| 485,895 | 5/1938 | United Kingdom | 251/33 |
| 1,017,567 | 1/1966 | United Kingdom | 119/14.18 |

*Primary Examiner*—Robert L. Bleutge
*Attorney, Agent, or Firm*—Gausewitz, Carr & Rothenberg

[57] ABSTRACT

A mechanical self-timing valve is connected between a source of sanitizing solution and a milking machine to sanitize the milking machine between each milking operation. Initiation of the valve cycle is accomplished by pressing a button-type plunger to admit pressurized fluid to a cylinder and drive the piston and valve poppet to a flush position. Return of the poppet and piston to a drain position is resisted by pressurized fluid in the cylinder which is permited to bleed through a long, large diameter helical bleed conduit that winds around the plunger. In flush position, a sanitizing solution is directed through the valve, through a flexible milking line and through the claw and teat cups of the milking machine. In drain position, flow of sanitizing solution is blocked and the disconnected milking machine is gravity drained of remaining sanitizing solution, partly through the disconnected teat cups and partly through a valve drain port.

21 Claims, 7 Drawing Figures

Fig. 2.

SYSTEM FOR FLUSHING OF A MILKING MACHINE

BACKGROUND OF THE INVENTION

1. Field of the Invention

This invention relates to the field of milking machine systems and more particularly concerns a system for providing a sanitizing flush of such milking machine.

2. Description of Prior Art

Maintenance of high levels of sanitation in milking of cows is important both for the quality of the milk obtained and for the health of the animals involved. With regard to the health of the cows a major problem is the wide incidence of mastitis, a disease which seriously degrades productivity of many milking herds. The present-day desire for total automation, pushing more and more cows through the barn, together with the indifference to health and longevity of individual animals, may actually reduce monetary return for the dairyman by perpetuating and increasing the costly mastitis disease.

It has been shown that mastitis is spread during milking, not only from quarter to quarter but also from cow to cow. Thus, sanitizing solutions are desirably applied to the milking machines and may also be applied to the cows. Systems presently in use are manually controlled. They are not automatic, not adequately timed, difficult and relatively time consuming to operate, and not commercially successful.

Electrical timing devices may be employed for control of a valve but such electrical apparatus is not desirable in the environment of the milking machine since it introduces insulation problems, shock hazards and added expense of installation and maintenance.

For timing of an operation by means of bleeding of a pressure chamber, small capillary-type restrictive orifices or passages have been employed to provide a restriction of the bleeding flow sufficient to obtain a desired delay interval. Small diameter capillary-type passages are difficult and costly to produce with adequate repeatability and precision of operation and further, are readily subject to malfunction because the smaller the passage, the more readily it is obstructed by foreign matter in the solution being handled.

Accordingly, it is an object of the present invention to provide for the flushing of a milking machine with improved efficiency, reliability and control, while eliminating or minimizing problems present in other sanitizing systems.

SUMMARY OF THE INVENTION

In carrying out principles of the present invention in accordance with a preferred embodiment thereof there is provided a sanitizing system for use with a cow milking machine system having a teat cup, a milk collection line and a flexible milk line detachably connected to the milk collection line. The sanitizing system includes a source of sanitizing solution, a sanitizing solution line, and valve means connected with the sanitizing line and adapted to be detachably connected to the flexible milk line for providing a timed flow of the sanitizing solution through the flexible milk line and teat cup. The valve means includes means for draining the flexible milk line after the timed flow of sanitizing solution. A valve closure is movable between flush and drain positions under control of a pressure controlled operator of which the controlling pressure is bled via a long and circuitous large cross-sectional area bleed conduit. More specifically, the valve cycle is initiated by a plunger that opens a pilot valve to pressurize a piston cylinder, causing its piston to drive a valve poppet so as to close the valve drain port and then open the input port. The initiating plunger is formed with a long, large cross-section conduit wound in a helical path about its periphery, communicating with the piston cylinder pressure to provide a slow bleed thereof to retard spring-urged return of the valve poppet.

DETAILED DESCRIPTION

The flushing system of the present invention is particularly adapted for use with widely employed conventional milking machine systems. Details of one such system are described in my prior U.S. Pat. No. 3,811,467 for Cow Milking Machine System and Vacuum Regulator Incorporated Therein. Briefly, such a milking machine system includes a number of milking stations spaced along a common vacuum milk collection line 26 as partly illustrated in FIG. 1. Each station comprises a plurality of teat cups 10, 12, 14 and 16 connected with a common claw 18. Claw 18 is connected with a flexible milk line 20 which, in turn, is adapted to be detachably connected by a connector element 22 to an adjacent one of a plurality of mating detachable connector fittings 24, 24a on the vacuum milk connection line 26. One end of line 26 is connected to a suitable source of vacuum (not shown). Claw 18 is also connected via lines 28 and 29 to a pulsator 30 which repetitively varies the pressure of the teat cup upon the teat. Unused and unconnected fittings 24, 24a are automatically capped when not in use.

For milking of a cow, teat cups 10 through 16 are connected to the cow and the quick-disconnect fitting 22 is connected to fitting 24 of the milk line. After milking, the teat cups are disconnected from the cow, flexible milk line 20 is engaged upon and hung from a raised hook 32 and fitting 22, at the end of the milk line 20, is connected to a mating fitting 34 (FIG. 2) on a flush valve 36. It will be readily appreciated that many different types of quick-disconnect fittings well known to those skilled in the art may be employed as deemed necessary or convenient. In the exemplary fitting illustrated herein, the flush valve fittings (and the milk line fittings) each include a circumferential groove 37 having an upper tapered side and a flat facing surface. A flexible sealing sleeve 39 is fixed between the fitting and the valve body. The female portion of the quick-disconnect fitting, which is permanently connected to the flexible milk line (FIG. 1) includes a plate having downwardly and inwardly projecting flanges 19, 21 which are adapted to be slidably engaged in opposite sides of the peripheral groove 37 of the fitting 34. A third flange 23 depends from the plate of the female fitting to engage the fitting 34 and facilitate proper positioning of the two fitting parts.

Flush valve 36 is connected to a tee 38 mounted in a sanitizing solution line 40 which, in turn, is connected to a pressurized source of suitable sanitizing solution 42. Such a solution may be water alone or water having suitable chemicals such as iodine and phosphoric acid added thereto. Additional tees 38a, and flush valves 36a are connected to the line 40 at the respective milking stations, adjacent the milk collection line fittings 24a so that each flexible milk line such as line 20 may be readily shifted between connection with a connector fitting of line 26 and one of the flush valves.

After application of sanitizing solution, the milking machine, teat cups, claw and flexible milk line, all must be adequately drained. If the milk line must be disconnected from the sanitizing valve and allowed to drain before it is again connected to the vacuum milk connection line, an additional step is necessary in the handling of the apparatus. For this reason, it is important to enable the apparatus to drain immediately after the flushing operation but without disconnection from the sanitizing line so that the milk line 20 need be handled but one time in disconnecting it from the sanitizing line 40 and reattaching it to the vacuum milk connection line 26. The flush valve is uniquely arranged to accomplish this drain operation in a simple and convenient fashion by incorporating a drain mode in the drain cycle.

Flush valve 36 is normally in a drain condition and will allow draining from the valve drain port of any liquid within the valve and of liquid flowing into the valve from a line such as milk line 20 connected to the valve output. The flush valve is self-timing and self-cycling. Valve cycling is initiated with the milking machine positioned in the arrangement illustrated in FIG. 1, hung from raised hook 32, with the teat cups and one part of flexible milk line 20 draining to the ground and with the other part of flexible milk line 20 draining to the ground through the valve 36. Upon initiation of operation, the valve will allow sanitizing solution from source 42 to flow through line 20, through the claw 18 and through the teat cups and thence out onto the ground. After a period such as ten seconds, as determined by the valve, the latter recycles itself to its drain condition, blocking further flow of sanitizing solution and allowing fluid in one part of the flexible line 20 and within the valve to drain from the valve drain port onto the floor.

VALVE STRUCTURE

Figure 2:
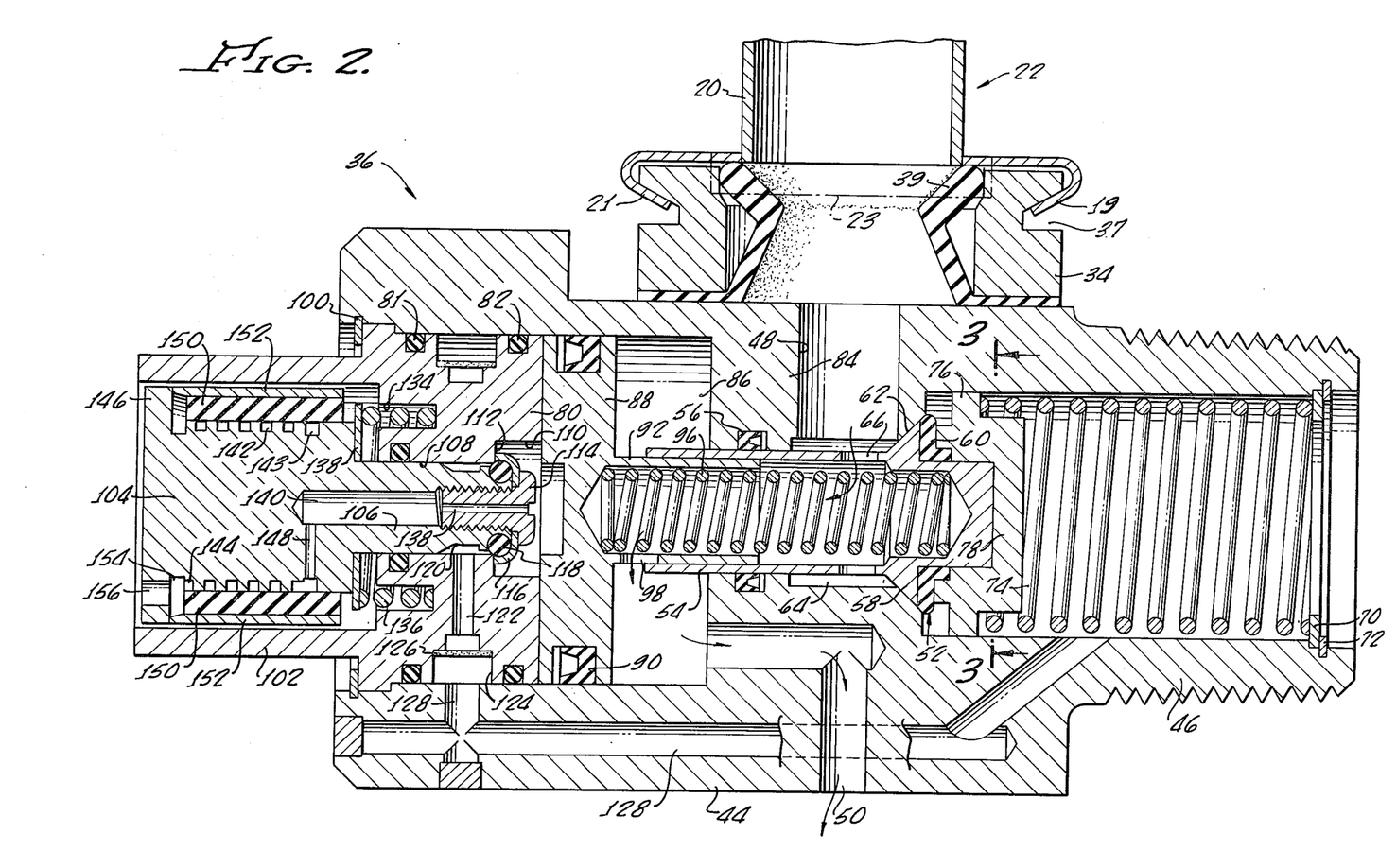
FIG. 2 is an enlarged cross-sectional view of the flush valve of FIG. 1.

Referring now to FIG. 2, the flush valve includes a valve body 44 having an input port defined by a threaded nipple 46 that is connected to the flush line tee 38, an output port defined by a passage 48 that connects with the quick-disconnect fitting 34, and a drain port comprising an L-shaped bore 50.

A valve closure in the form of a poppet guide 78 is slidably mounted within the valve body and includes a poppet stem 54, sealed to the valve body by means of a fixed annular seal 56, and a conical poppet head 58 having a poppet seal 60. Head 58 and seal 60 mate with and sealingly engage a conical valve body seat 62. The valve body is provided with an internal annular enlargement 64 adjacent the seat 62 that communicates with the valve output port 48 and with an aperture 66 formed in a portion of the poppet stem adjacent the poppet head 58.

A washer 70 retained by a snap ring 72 affords a bearing surface for one end of a helical poppet return compression spring 74 of which the other end bears against an outwardly projecting flange 76 formed on a cup-shaped poppet guide 78. Guide 78 receives the poppet head and presses against the poppet head and poppet seal 60 in response to pressure exerted by spring 74. Flange 76 of poppet guide 78 is suitably relieved (FIG. 3) at spaced points along its periphery to permit passage of fluid from the input port past the poppet guide to the valve seat 62.

The other end of the valve body is provided with an enlarged bore that is closed by a valve body closure plug 80 sealed to the valve body by seals 81, 82. The body closure plug 80 is spaced from a transversely extending valve body structure 84 to define therewith end walls of cylinder 86. The stem of poppet 52 extends through an aperture in transverse body structure 84 and, in certain valve positions, into the cylinder 86.

A piston 88, having a peripheral piston seal 90, is slidably mounted within cylinder 86 and includes an integral hollow stem 92 which is positioned in telescoping sliding relation within the end of the hollow poppet stem 54. A helical piston return compression spring 96 is interposed between the telescoping poppet stem and piston stem, bearing at one end upon the piston and at the other end upon the poppet head, and tending to drive the piston relative to the popped (toward the left in FIG. 2). Piston stem 92 is provided with an aperture 98 that communicates with the drain port 50 via the chamber 86 in the drain position of the valve, illustrated in FIG. 2.

Valve body closure plug 80 is retained within the valve body by a snap ring 100 and includes an outwardly projecting tubular extension 102 in which is mounted a valve initiating plunger and bleed body 104. Plunger 104 includes an integral plunger stem 106 that is slidably mounted within a bore 108 extending through the valve body closure plug 80. Bore 108 is formed with an enlarged portion 110, adjacent cylinder 86, that provides a shoulder 112 which defines a seat for a pilot valve. Stem 106 has one end thereof threaded to receive a headed pilot valve screw 114 having a captured flanged washer 116 retained beneath its head to retain, in turn, a pilot valve O-ring 118 that forms the pilot valve closure seal, bearing against an edge of the shoulder 112.

Plunger stem 106 is necked down near its free end, as indicated at 120, to provide an annular chamber in communication with a bore 122 extending radially through the closure plug 80. Bore 122 is provided with a stepped englargement 124 at its outer end to receive a filter 126. Bore 122 communicates with a passage 128 formed in the wall of valve body 44 and extending through the valve body for connection with the interior of input port nipple 46, thereby to provide a supply of pressurized fluid from the upstream side of the valve to the bore 108 of plunger stem 106.

Valve closure plug 80 is formed with an axially facing annular groove 134 that opens into the inner end of tubular extension 102 and receives a helical compression spring 136 which bears upon a washer 138 surrounding the plunger stem and abutting the plunger body.

Figures 1, 3, 4:
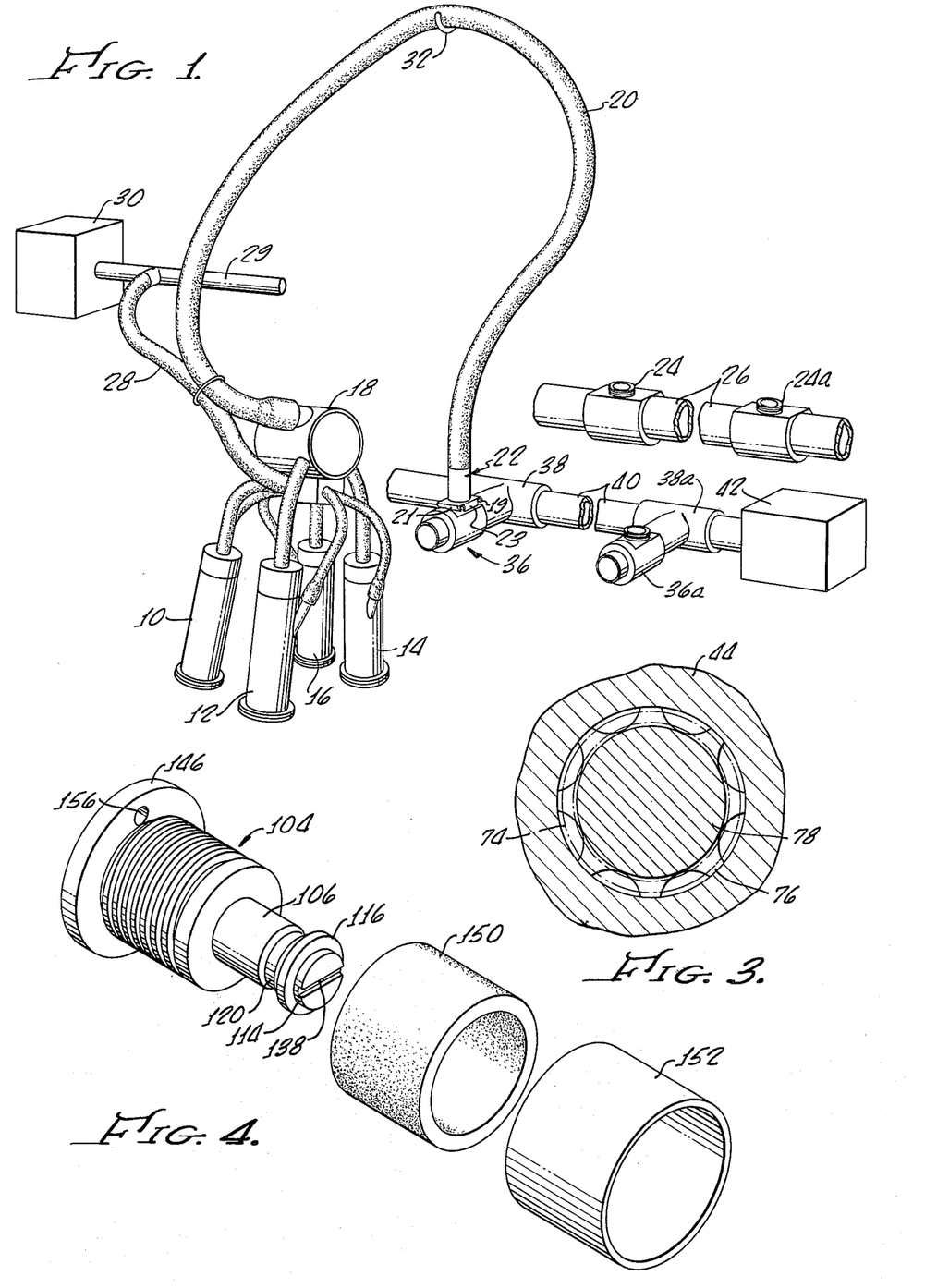
FIG. 1 is a perspective illustration of a milking machine connected with a flushing system of the present invention.
FIG. 3 is a section taken on lines 3—3 of FIG. 2.
FIG. 4 is an exploded perspective view of the valve plunger showing the circuitous helical groove and the sealing sleeves therefor.

Plunger 104, in addition to providing an operating mechanism for the pilot valve to initiate cycling of the flush valve, also provides the time delay by means of a long, relatively large cross-sectional area bleed conduit that connects the cylinder 86 to ambient pressure via a long circuitous path. For such bleeding operation, pilot valve screw 114 is provided with an axial aperture 138 that communicates with a bore 140 extending axially into the plunger stem. As best seen in FIGS. 2 and 4, the outer surface of the body of the circular cylindrical plunger is formed with a continuous helical groove 142 that winds about the outer surface of the plunger body from an innermost turn 143 to an outermost turn 144. The latter is adjacent a continuous peripheral flange 146 formed on the outer end of the plunger body and providing an operating surface for pressing the plunger (toward the right as viewed in FIG. 2) to initiate valve cycling.

Plunger stem bore 140 communicates with the inner turn of helical groove 143 via an internal passage 148. The continuous helical groove 142 is formed into a continuous helical closed conduit by means of a sleeve 150 that seals the external surface of the plunger body, completely circumscribing the plunger in close and sealing contact with its external surface, thereby sealing each turn of the helical groove. Sealing sleeve 150 is a resilient elastomeric material such as an ethylene-propylene rubber (EPR) which is somewhat stretched as it is applied to and over the exterior surface of the plunger. Other materials may be used for sleeve 150, such as a material which is heat shrunk upon the plunger body to seal the helical grooves. A rigid and inextensible protective sleeve 152, preferably of metal, encircles the sealing sleeve 150 extending slightly beyond the latter. Sealing sleeve 150 terminates at a point spaced from the plunger flange 146 to provide an annular space 154 communicating on one side with the end turn 144 of the helical bleed passage and on the other side with an aperture 156 formed in the flange 146. Aperture 156 is open to ambient pressure for draining of bleed fluid.

Although many configurations are available, it is presently preferred to form groove 142 with a substantially square cross-section of about 0.020 inches on each side. Other arrangements for forming a long, circuitous bleed conduit are contemplated. For example, the open helical groove may be formed on an internal surface of sleeve 150 and sealed, to define a long closed conduit, by a smooth and continuous exterior surface of plunger body 104. Flange 146 and protection sleeve 152 are a loose sliding fit within extension 102.

OPERATION

As previously described, the flush valve is employed after a milking operation, that is, after disconnecting the teat cups from the cow, disconnecting the female detachable connector part 22 from the vacuum milk connection line, and after connecting fitting 22 to the valve fitting 34. The flexible milk line is raised, being suspended, as by being engaged over hook 32, and the milking machine is sanitized by passing a sanitizing solution from the sanitizing solution line 40 through valve 36, through flexible milk line 20, through the claw 18 and through each of the teat cups 10, 12, 14 and 16. The sanitizing solution is caused to flow through the milking machine for a pre-selected and a repeatably precise period of time such as 10 to 15 seconds, for example, at the end of which time the flow of sanitizing solution is cut off and the flexible milk line 20 is caused to drain both through the teat cups and through the flush valve 36. A drain time of at least three minutes is preferred.

In the normal condition, the valve is in the drain position illustrated in FIG. 2. The head of poppet or valve closure 58 and seal 60 are seated upon valve seat 62 to thereby block the inlet port and prevent flow of sanitizing solution. Springs 74 and 96 urge the poppet 52 and the piston 88 to the extreme left limits of their range of motions wherein the poppet is seated upon the valve seat and the piston abuts the inner surface of the cylinder wall of closure plug 80. In this condition, both aperture 66 in the poppet stem and drain aperture 98 in the piston stem are unblocked and fluid may drain from the flexible milk line through the fitting 34, through the interior of the valve and poppet stem, through the drain aperture 98, and through the drain passage 50 to the ground or other drain sump.

Figure 5:
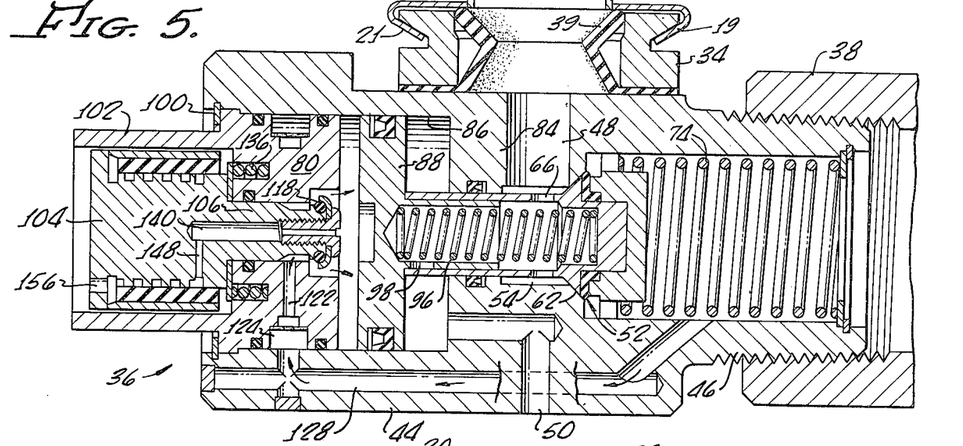
FIG. 5 is a sectional view of the valve as it moves from drain position.

To initiate the self-timing, self-cycling flushing operation of the valve, one momentarily presses the plunger body 104 against resistance of plunger return spring 136, toward the right as viewed in FIG. 5, to open the pilot valve 112, 114, 116, 118, whereby upstream pressurized sanitizing solution will flow via passages 128 and 122 and through the open pilot valve into cylinder 86 at one side (the left as viewed in FIGS 5, 6 and 7) of piston 88. Piston 88, having a considerably larger diameter than the diameter of the head of poppet 52, has a considerably larger area and therefor a greater net force is exerted upon the piston than upon the poppet by fluid of a given unit pressure. Thus, when both the left side of the piston and the right side of the poppet are subjected to a substantially equal unit pressure, there is a net force to the right on the combination of piston and poppet. Pressure of the fluid in the cylinder drives the closure operator (the piston) to the right, telescoping its stem into the hollow stem of the valve closure (the poppet), without initially moving the poppet. Poppet return spring 74 is considerably stronger than piston return spring 96 whereby the latter is compressed during initial portion of the piston travel, until the body of the piston abuts the free end of the poppet stem and the valve attains the position illustrated in FIG. 5. During this initial motion, drain aperture 98 becomes closed by entry of the piston stem into the poppet stem. Thus, the drain aperture 98 is completely closed before the poppet begins to open.

Figure 6:
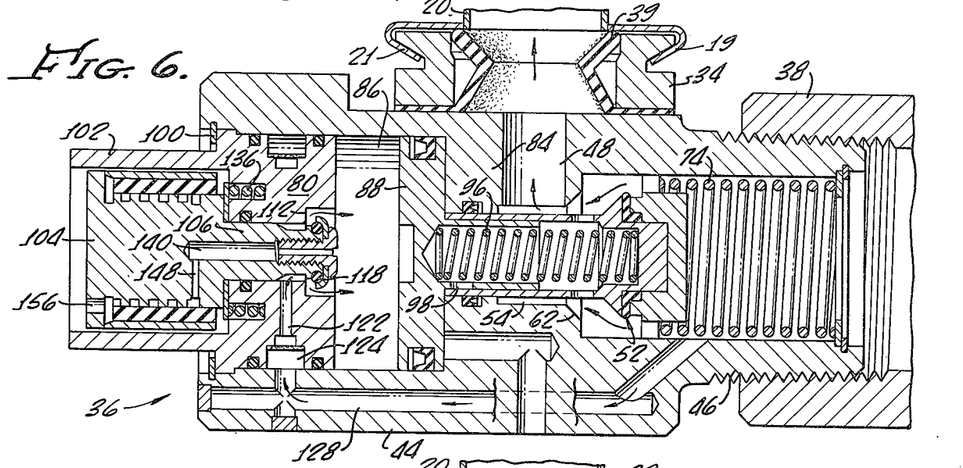
FIG. 6 is a sectional view of the valve in flush position.

With the piston body in abutment with the end of the poppet stem, continued motion of the piston to the right under pressure of the upstream fluid (which continues to enter cylinder 86 as long as the plunger 104 is depressed and held in the position illustrated in FIGS. 5 and 6), now forces the poppet toward the right, moving the poppet head 58 from the valve seat and placing the valve in the flush position illustrated in FIG. 6. This motion is limited by abutment of piston 88 with valve body structure 84. Release of the short duration pressure on plunger 104 allows plunger return or triggering spring 136 to move the plunger to the left and close the pilot valve 112, 118 to prevent further relatively high pressure upstream fluid from entering the cylinder 86.

In this flush position of FIG. 6, the drain port is closed and the input port is open, in communication with the output port and fitting 34. Sanitizing solution under suitable pressure such as, for example, about 40 pounds per square inch, will flow from the source of sanitizing solution through the sanitizing pipe 40, through the valve, through flexible milk line 20, through claw 18 and through all of the teat cups connected thereto from whence the sanitizing solution is discharged to the floor or to a suitable drain sump (not shown).

As previously mentioned, it is desired to provide this flushing flow of sanitizing solution for a precisely repeatable pre-determined period of time, such as ten to fifteen seconds, for example.

Accordingly, as soon as plunger 104 is released to close the pilot valve 112, 118, the run down of the delay period commences. This delay period is determined by the time required for the pressurized fluid within cylinder 86 to flow from the cylinder, through the bleed conduit delay means to ambient pressure for discharge. Pressure on the fluid within the cylinder 86 and flow of the fluid from the cylinder through the bleed conduit during the delay period results at least in part from the force of the return spring 74 (until the poppet head 58 seats upon seat 62) together with the pressure of upstream fluid upon the upstream end of the poppet itself.

During the delay period fluid is forced from cylinder 86 through the passage 138 in pilot valve screw 114, through the bore 140 of the plunger stem 106, through passage 148 and thence through the multiple turns of the helical bleed conduit 142 for discharge through aperture 156 of the plunger flange 146. The bleed conduit 142 has a relatively large cross-section and thus is less subject to blockage and obstruction due to buildup of deposits in the conduit or impurities and other foreign bodies carried in the sanitizing solution and which may pass the filter 126. Nevertheless, despite its relatively large cross-section, the great length of the multiple turn bleed conduit provides a sufficiently large restriction to flow of the bleeding fluid and thus a time delay of the desired magnitude is readily obtained, even with the large cross-section passage.

Figure 7:
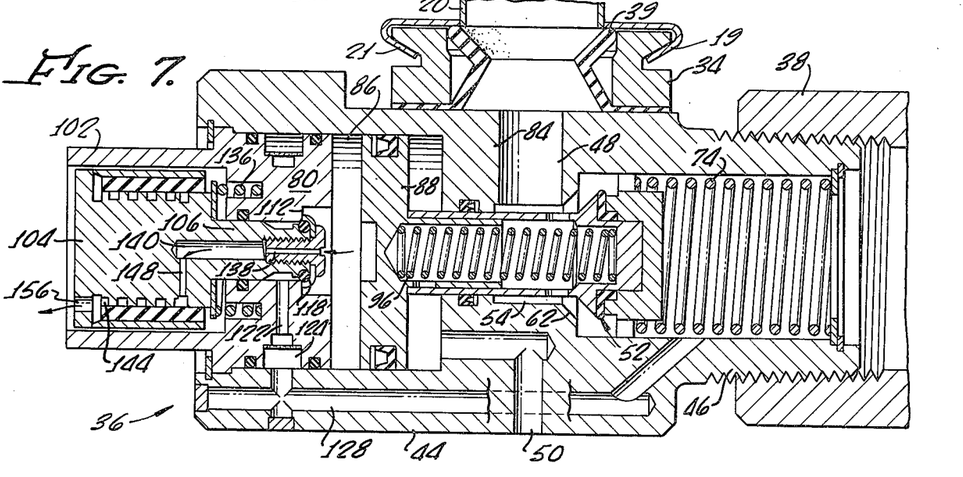
FIG. 7 is a sectional view of the valve in bleed position as it moves from flush position toward drain position.

As fluid bleeds from the chamber 86 through the bleed conduit 142, the poppet and piston return toward the drain position as a unit, moving toward the left as viewed in FIGS. 6 and 7. When the poppet closure 58, 60 engages the valve seat 62, further movement of the poppet to the left is haulted and the action of the poppet return spring 74 can produce no further motion, this spring now being operative merely to hold the poppet in the closed position. However, piston return spring 96, which is compressed by relative motion of the piston, relative to the poppet stem, from a position shown in FIG. 2 to the position shown in FIG. 5, now acts to drive the piston from the poppet stem and to further expel fluid from the cylinder via the bleed conduit. During this last portion of return motion of the piston, the piston stem telescopes outwardly of the poppet stem thus unblocking the drain aperture 58 in the piston stem after the poppet has been fully seated.

It is noted that the arrangement of conical poppet seat and telescoping piston and poppet stems affords a low friction configuration that permits operation of movable valve elements with application of relatively small forces. Yet not only is a tight sealing provided, but two valving operations occur in sequence. On motion from drain position, the drain port is first closed and then the imput port is opened. These actions occur in reverse order upon motion from flush position.

Unblocking of the drain aperture 98 continues until the piston seats upon the inwardly facing surface of the cylinder wall or valve body plug 80, at which point the valve has completed its cycle and returned to the drain position illustrated in FIG. 2. Now sanitizing solution within the one portion of the flexible milk line 20 and within the valve body itself, will drain via the drain passage 50. The valve is preferably positioned upon the sanitizing solution line 40 with the drain passage 50 at the bottom of the valve and pointing downwardly so as to facilitate drainage. Preferably, the milking machine remains connected to the valve and drain position after completion of a flushing cycle for approximately three minutes to ensure complete drainage of the flushing solution from the milk line 20. After completion of such drainage, milk line 20 is ready for reconnection to the vacuum milk collection line 26 and for connection of the cups 10, 12, 14 and 16 to another cow. If deemed necessary or desirable, milking may be proceeded by a teat sanitization step employing a sanitizing cup (not shown), preferably of a type that will apply sanitizing solution only to the area of the teat that will actually contact the teat cup liner. Such cup is connected through a separate flexible line and valve (not shown) which may be identical to the valve 36, for application of sanitizing solution directly to the selected area of the teat.

Although the milking machine illustrated includes a claw connected with a plurality of teat cups, it will be understood that principles of the present invention are equally applicable to milking machines which do not employ a claw but instead connect a teat cup directly to a vacuum milk connection line. The present invention contemplates the mechanically self-timed and automatically self-cycling application of sanitizing solution to a milking machine of whatever type employed and particularly to those parts of the milking machine by means of which mastitis is most likely to be transmitted. Flush valves are provided in close adjacency to a number or all of the milk vacuum line connections to facilitate use at each milking station and to provide a complete self-timed cycle of flush and drain during connection to the flush valve.

There has been disclosed a flushing system for milking machines including a self-timing, self-cycling flush and drain valve that is readily triggered, and is mechanically and hydraulically operable, and having a precise, reliable bleed conduit. Since the sanitizing line is completely separate from the milk line and cannot be connected thereto, there is no danger of contamination of the milk with sanitizing solution in the case of valve failure.

The foregoing detailed description is to be clearly understood as given by way of illustration and example only, the spirit and scope of this invention being limited solely by the appended claims.

What is claimed is:

1. In combination with a cow milking machine system comprising a teat cup, a milk collection line, and a flexible milk line connected to the teat cup and detachably connected to the milk collection line, a sanitizing system comprising
   a source of sanitizing solution,
   a sanitizing solution line connected with said source of sanitizing solution,
   valve means connected with said sanitizing solution line and adapted to be detachably connected to said flexible milk line for providing a timed flow of said sanitizing solution through said flexible milk line and teat cup, said valve means including a valve body having an input port connected with said sanitizing solution line, an output port adapted to be connected to said flexible milk line, valve closure means movable between closed and open positions for respectively blocking an unblocking flow of sanitizing solution between said input port and said output port, means for moving said closure means to said open position, and means for providing delayed motion of said closure means to said closed position comprising a cylinder, piston means mounted within the cylinder for motion in response to motion of said closure means toward said closed position, means for introducing fluid into said cylinder at one side of the piston, and means for providing a restricted bleed passage for said one side of the cylinder.

2. The combination of claim 1 wherein said means for providing a restricted bleed passage comprises a circuitous passage connected with said cylinder.

3. The combination of claim 2 wherein said means for providing a restricted passage comprises a bleed body having a continuous groove extending along the surface of said bleed body in a circuitous path and means for sealing the surface of said bleed body and cooperating with said groove to provide a closed circuitous conduit extending along said bleed body, said conduit having one end in communication with said cylinder and the other end in communication with ambient pressure.

4. A self-timing valve comprising
a valve body having an input port, an output port and a drain port,
poppet means for directing flow through said valve,
said poppet means being slidably mounted in said body for motion between a closed position in which said input port is blocked and said drain port is open and an open position in which said input port is open and said drain port is closed,
return spring means interposed between said valve body and one end of said poppet means for urging said poppet means to said closed position,
a cylinder within said valve body at the other end of said poppet means,
a piston within said cylinder engaging said other end of said poppet means,
a cylinder end plug within said body forming a wall of said cylinder and having a chamber formed therein in communication with said cylinder,
means for introducing pressurized fluid into said chamber,
pilot valve means for selectively blocking flow of fluid from said chamber into said cylinder,
means for operating said pilot valve means, and
means for bleeding pressure from said cylinder.

5. The apparatus of claim 4 wherein said means for bleeding pressure from said cylinder comprises a plunger body having a circuitous groove formed in an external surface thereof, means for sealing said surface to cooperate with said plunger body groove and form a circuitous bleed conduit, and conduit means for interconnecting one end of said circuitous bleed conduit with said cylinder.

6. The apparatus of claim 5 wherein said pilot valve means comprises a valve seat formed in said cylinder end plug chamber and a stem projecting from said plunger body into said chamber, said stem including a valve element cooperating with said valve seat to block passage between said chamber and said cylinder, said plunger body being slidably mounted to said cylinder end plug and said conduit means connecting said circuitous bleed conduit with said cylinder comprising a passage extending through said pilot valve element, through said plunger body stem, and through said plunger body to one end of said bleed conduit.

7. The combination of claim 6 wherein said other end of said poppet means includes a tubular section, said piston including a tubular stem in telescoping engagement with said tubular section of said poppet means, said drain port including a drain aperture formed in one of said telescoping sections of said poppet means and piston stem, said tubular poppet section including an aperture formed therein in communication with said output port.

8. In a self-timing valve having a valve closure urged to a given position and having motion of said closure toward such given position resisted by restricted flow of fluid from a fluid containing chamber, improved means for restricting flow from said chamber comprising
a bleed body,
a circuitous groove formed upon a surface of said body,
means for sealing the surface of said body to cooperate with said groove and define a closed circuitous bleed passage,
means for connecting one end of said bleed passage with said chamber, and
means for connecting the other end of said bleed passage to a region of relatively lower pressure.

9. The self-timing valve of claim 8 wherein said bleed body comprises a substantially circular cylindrical member, said groove extending in a helical path about the exterior of said body, said means for sealing said external surface comprising an impervious sleeve extending about and tightly engaged with the exterior surface of said cylindrical body.

10. The self-timing valve of claim 8 wherein said chamber includes a wall having an aperture therethrough, said bleed body including a stem extending at least partly through said aperture, said stem having a conduit extending therethrough into communication with said bleed passage.

11. The self-timing valve of claim 10 including a piston slidably mounted within said chamber and connected with said valve closure, said piston being mounted for motion toward said chamber wall as said closure moves toward said given position, a chamber pressurizing passage extending through said wall into said wall aperture, said bleed body stem being movably mounted in the aperture of said chamber wall and including means for selectively blocking flow between said chamber and said chamber pressurizing passage, whereby pressurized fluid may be admitted to said chamber via said wall aperture and via said pressurizing passage when said bleed body stem is in a position wherein said wall aperture is unblocked, thereby to drive said piston and closure from said given position, and whereby pressurized fluid in said chamber will bleed through the passage in said stem and through said bleed passage when said stem blocks flow of pressurized fluid between said chamber and said pressurizing fluid passage.

12. In a cow milking machine system including a teat cup and a flexible milk line connected to the teat cup and adapted to be connected to a milk collection line, the improvement comprising apparatus for flushing said flexible milk line and said teat cups with a sanitizing solution, said apparatus comprising a source of sanitizing solution a sanitizing line connected to said sanitizing solution source, and a flush valve connected to said sanitizing line, said flush valve comprising milk line fitting means for connecting said valve to said flexible milk line, a drain port, valve closure means movably mounted for blocking communication between said milk line fitting means and said sanitizing line in a drain position, for unblocking communication between said milk line fitting means and said drain port in said drain position, for unblocking communication between said sanitizing line and said milk line fitting means in a flush position and for blocking communication between said milk line fitting means and said drain port in said flush position, means for moving said closure means to said flush position, means for urging said closure means to said drain position, and means for retarding motion of said closure means from said flush position to said drain position.

13. The milking machine system of claim 12 wherein said means for retarding motion of said closure means comprises a cylinder, a piston slidably mounted in said cylinder connected with said closure means, a bleed body, a circuitous groove formed upon a surface of said body, means for sealing the surface of said body to cooperate with said groove and define a closed circuitous bleed passage, means for connecting one end of said bleed passage with said cylinder, and means for connecting the other end of said bleed passage to a region of relatively lower pressure.

14. The milking machine system of claim 13 wherein said bleed body comprises a substantially circular cylindrical member, said groove extending in a helical path about the exterior of said body, said means for sealing said external surface comprising an impervious sleeve extending about and tightly engaged with the exterior surface of said cylindrical body.

15. The milking machine system of claim 13 wherein said cylinder includes a wall having an aperture therethrough, said bleed body including a stem extending at least partly through said aperture, said stem having a conduit extending therethrough into communication with said bleed passage.

16. The milking machine system of claim 15 including a cylinder pressurizing passage extending through said wall into said wall aperture, said bleed body stem being movably mounted in the aperture of said cylinder wall and including means for selectively blocking flow between said cylinder and said cylinder pressurizing passage, whereby pressurizind fluid may be admitted to said cylinder via said wall aperture and via said pressurizing passage when said bleed body stem is in a position wherein said wall aperture is unblocked, thereby to drive said piston and closure from said flush position, and whereby pressurized fluid in said cylinder will bleed through the passage in said stem and through said bleed passage when said stem blocks flow of pressurized fluid between said cylinder and said pressurizing fluid passage.

17. A self-cycling valve comprising a body having an input port and an output port in fluid communication with each other and a drain port in communication with one of said input and output ports, closure means movably mounted within the body for blocking communication between said input and output ports and unblocking communication with said drain port in a drain position, and for unblocking communication between said input and output ports and blocking communication with said drain port in a flow position, means for moving said closure means to said flow position, means for urging said closure means toward said drain position, and means for retarding motion of said closure means from said flow to said drain position.

18. The valve of claim 17 wherein said means for moving said closure means includes a closure operator movably mounted within said body and connected with said closure means, and a valve cycle initiator, said valve cycle initiator including means for driving said closure operator and said closure means toward said flow position and including delay means for retarding motion of said closure operator and closure means towards said drain position.

19. The valve of claim 18 wherein closure operator and said elay means comprise a fluid cylinder formed within said valve body, a piston movably mounted within said cylinder and connected with said closure means, means for pressurizing said cylinder at one side of said piston to drive said piston and closure toward said flow position, and means for bleeding pressure of said cylinder.

20. The valve of claim 19 wherein said means for bleeding pressure of said cylinder comprises a circuitous conduit extending from said cylinder to ambient pressure.

21. The valve of claim 19 wherein said means for bleeding pressure of said cylinder comprises a bleed body having a helical groove formed in an external surface thereof, a heat shrunk sleeve extending closely about said body in sealing relation to said groove to define therewith a helical bleed passage and a conduit connecting said cylinder with said bleed passage.

* * * * *

UNITED STATES PATENT OFFICE
CERTIFICATE OF CORRECTION

PATENT NO. : 3,958,584
DATED : May 25, 1976
INVENTOR(S) : Leon Jones

It is certified that error appears in the above-identified patent and that said Letters Patent are hereby corrected as shown below:

In the Abstract, line 9, change "permited" to --- permitted ---.
Column 4, line 32, change "popped" to --- poppet ---.
Column 7, line 64, change "imput" to --- input ---.
Column 9, line 4, change "an" to --- and ---.
Column 11, line 55, change "pressurizind" to --- pressurized ---.
Column 12, line 38, change "elay" to --- delay ---.

Signed and Sealed this

Fourteenth Day of September 1976

[SEAL]

Attest:

RUTH C. MASON
*Attesting Officer*

C. MARSHALL DANN
*Commissioner of Patents and Trademarks*